(12) United States Patent
Reinshagen et al.

(10) Patent No.: US 12,517,915 B2
(45) Date of Patent: *Jan. 6, 2026

(54) SYSTEM AND METHOD FOR DATA ANALYTICS WITH AN ANALYTIC APPLICATIONS ENVIRONMENT

(71) Applicant: ORACLE INTERNATIONAL CORPORATION, Redwood Shores, CA (US)

(72) Inventors: Dirk Reinshagen, San Carlos, CA (US); Jagdish Chand, Dublin, CA (US); Ananth Venkata, San Ramon, CA (US); Renu Chintalapati, San Ramon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/889,201

(22) Filed: Sep. 18, 2024

(65) Prior Publication Data

US 2025/0013652 A1  Jan. 9, 2025

Related U.S. Application Data

(63) Continuation of application No. 18/137,306, filed on Apr. 20, 2023, now Pat. No. 12,124,461, which is a
(Continued)

(51) Int. Cl.
*G06F 16/2458* (2019.01)
*G06F 16/21* (2019.01)
(Continued)

(52) U.S. Cl.
CPC ........ *G06F 16/2465* (2019.01); *G06F 16/211* (2019.01); *G06F 16/2282* (2019.01); *G06F 16/283* (2019.01)

(58) Field of Classification Search
CPC .................. G06F 16/2465; G06F 16/2282
(Continued)

(56) References Cited

U.S. PATENT DOCUMENTS 7,151,438 B1   12/2006  Hall
7,739,292 B2   6/2010   Falk
(Continued)

FOREIGN PATENT DOCUMENTS

CN   101971176   2/2011
CN   105900059   8/2016
(Continued)

OTHER PUBLICATIONS

Intellectual Property India, Examination report under sections 12 & 13 of the Patent Act, 1970 and the Patents Rules, 2003 dated Feb. 15, 2024 for India Patent Application No. 202147017548 , 7 pages.
(Continued)

*Primary Examiner* — Muluemebet Gurmu
(74) *Attorney, Agent, or Firm* — TUCKER ELLIS LLP

(57) ABSTRACT

In accordance with an embodiment, an analytic applications environment enables data analytics within the context of an organization's enterprise software application or data environment, or a software-as-a-service or other type of cloud environment; and supports the development of computer-executable software analytic applications. A data pipeline or process, such as, for example, an extract, transform, load process, can operate in accordance with an analytic applications schema adapted to address particular analytics use cases or best practices, to receive data from a customer's (tenant's) enterprise software application or data environment, for loading into a data warehouse instance. Each customer (tenant) can additionally be associated with a customer tenancy and a customer schema. The data pipeline or process populates their data warehouse instance and
(Continued)

database tables with data as received from their enterprise software application or data environment, as defined by a combination of the analytic applications schema, and their customer schema.

20 Claims, 10 Drawing Sheets

Related U.S. Application Data continuation of application No. 16/862,394, filed on Apr. 29, 2020, now Pat. No. 11,640,406.

(60) Provisional application No. 62/885,118, filed on Aug. 9, 2019, provisional application No. 62/841,093, filed on Apr. 30, 2019.

(51) Int. Cl.
G06F 16/22 (2019.01)
G06F 16/28 (2019.01)

(58) Field of Classification Search
USPC .......................................................... 707/776
See application file for complete search history.

(56) References Cited

U.S. PATENT DOCUMENTS

| | | |
|---|---|---|
| 7,974,896 B2 | 7/2011 | Busse |
| 8,010,426 B2 | 8/2011 | Kopp |
| 8,150,744 B2 | 4/2012 | Zoldi |
| 8,386,419 B2 | 2/2013 | Yalamanchilli |
| 8,543,535 B2 | 9/2013 | Satpathy |
| 8,554,801 B2 | 10/2013 | Mack |
| 8,719,769 B2 | 5/2014 | Castellanos |
| 8,775,372 B2 | 7/2014 | Dary |
| 8,799,209 B2 | 8/2014 | Bakalash |
| 8,983,914 B2 | 3/2015 | Kung |
| 9,152,662 B2 | 10/2015 | Bhide |
| 9,239,996 B2 | 1/2016 | Moorthi |
| 9,244,951 B2 | 1/2016 | Mandelstein |
| 9,294,482 B2 | 3/2016 | Mellor |
| 9,355,145 B2 | 5/2016 | George |
| 9,430,505 B2 | 8/2016 | Padmanabhan |
| 9,442,993 B2 | 9/2016 | Tung |
| 9,460,188 B2 | 10/2016 | Mundlapudi |
| 9,465,653 B2 | 10/2016 | Kishore |
| 9,483,537 B1 | 11/2016 | Peters |
| 9,509,571 B1 | 11/2016 | Liu |
| 9,542,469 B2 | 1/2017 | Batra |
| 9,552,497 B2 | 1/2017 | Agarwal |
| 9,619,535 B1 | 4/2017 | Kapoor |
| 9,633,095 B2 | 4/2017 | Mehra |
| 9,870,629 B2 | 1/2018 | Cardno |
| 9,904,706 B2 | 2/2018 | Bhattacharjee |
| 9,922,104 B1 | 3/2018 | Kapoor |
| 9,961,011 B2 | 5/2018 | Mordani |
| 9,971,819 B2 | 5/2018 | Bender |
| 10,019,451 B2 | 7/2018 | Preslan |
| 10,055,431 B2 | 8/2018 | Marrelli |
| 10,078,676 B2 | 9/2018 | Bhagat |
| 10,108,683 B2 | 10/2018 | Dhayapule |
| 10,110,390 B1 | 10/2018 | Nguyen |
| 10,120,918 B2 | 11/2018 | Dhayapule |
| 10,191,802 B2 | 1/2019 | Nautiyal |
| 10,206,770 B2 | 2/2019 | Seng |
| 10,275,409 B2 | 4/2019 | Tung |
| 10,296,880 B2 | 5/2019 | Miller |
| 10,324,932 B2 | 6/2019 | Gordon |
| 10,423,639 B1 | 9/2019 | Kapoor |
| 10,423,688 B1 | 9/2019 | Patton |
| 10,437,846 B2 | 10/2019 | Venkatasubramanian |
| 10,552,443 B1 | 2/2020 | Wu |
| 10,572,679 B2 | 2/2020 | Frank |
| 10,620,923 B2 | 4/2020 | Allan |
| 10,635,686 B2 | 4/2020 | Wan |
| 10,664,321 B2 | 5/2020 | Reddipalli |
| 10,685,033 B1 | 6/2020 | Searls |
| 10,686,762 B2 | 6/2020 | Frahim |
| 10,762,086 B2 | 9/2020 | Wu |
| 10,795,895 B1 | 10/2020 | Taig |
| 10,817,530 B2 | 10/2020 | Siebel |
| 10,860,562 B1 | 12/2020 | Gupta |
| 10,866,938 B2 | 12/2020 | Gupta |
| 10,909,126 B2 | 2/2021 | Caputo |
| 10,936,614 B2 | 3/2021 | Kumar |
| 10,970,303 B1 | 4/2021 | Denton |
| 10,983,895 B2 | 4/2021 | Babu |
| 10,997,129 B1 | 5/2021 | Nanda |
| 11,106,508 B2 | 8/2021 | Calhoun |
| 11,190,599 B2 | 11/2021 | Greenstein |
| 11,194,795 B2 | 12/2021 | Muralidhar |
| 11,194,813 B2 | 12/2021 | Johnson, III |
| 11,250,344 B2 | 2/2022 | Maurya |
| 11,321,290 B2 | 5/2022 | Yan |
| 11,367,034 B2 | 6/2022 | Chintalapati |
| 11,436,259 B2 | 9/2022 | Chawla |
| 11,614,976 B2 | 3/2023 | Ramanathan |
| 11,640,406 B2 | 5/2023 | Reinshagen |
| 11,775,891 B2 | 10/2023 | Brown |
| 12,124,461 B2 | 10/2024 | Reinshagen |
| 2002/0178077 A1 | 11/2002 | Katz |
| 2006/0195492 A1 | 8/2006 | Clark |
| 2007/0073712 A1 | 3/2007 | Falk |
| 2007/0106577 A1 | 5/2007 | Kopp |
| 2008/0015919 A1 | 1/2008 | Busse |
| 2008/0162509 A1* | 7/2008 | Becker .................. G06F 16/27 |
| 2008/0195430 A1 | 8/2008 | Rustagi |
| 2008/0250057 A1 | 10/2008 | Rothstein |
| 2009/0076866 A1 | 3/2009 | Zoldi |
| 2009/0319544 A1 | 12/2009 | Griffin |
| 2010/0057548 A1 | 3/2010 | Edwards |
| 2010/0161648 A1 | 6/2010 | Eberlein |
| 2010/0280990 A1 | 11/2010 | Castellanos |
| 2011/0047525 A1 | 2/2011 | Castellanos |
| 2011/0055231 A1 | 3/2011 | Huck |
| 2011/0113467 A1 | 5/2011 | Agarwal |
| 2011/0208692 A1 | 8/2011 | Satpathy |
| 2011/0231454 A1 | 9/2011 | Preslan |
| 2011/0261049 A1 | 10/2011 | Cardno |
| 2011/0295793 A1 | 12/2011 | Venkatasubramanian |
| 2011/0295795 A1 | 12/2011 | Venkatasubramanian |
| 2012/0054249 A1 | 3/2012 | Batra |
| 2012/0089564 A1 | 4/2012 | Bakalash |
| 2012/0131591 A1 | 5/2012 | Moorthi |
| 2012/0191642 A1 | 7/2012 | George |
| 2012/0232950 A1 | 9/2012 | Kadkol |
| 2012/0290527 A1 | 11/2012 | Yalamanchilli |
| 2012/0310875 A1 | 12/2012 | Prahlad |
| 2013/0086121 A1 | 4/2013 | Preslan |
| 2013/0086134 A1 | 4/2013 | Doughan |
| 2013/0166515 A1 | 6/2013 | Kung |
| 2013/0185309 A1 | 7/2013 | Bhide |
| 2013/0191306 A1 | 7/2013 | Wilkinson |
| 2013/0238641 A1 | 9/2013 | Mandelstein |
| 2013/0332226 A1 | 12/2013 | Nair |
| 2014/0007190 A1 | 1/2014 | Alperovitch |
| 2014/0059217 A1 | 2/2014 | Pizurica |
| 2014/0075032 A1 | 3/2014 | Vasudevan |
| 2014/0122427 A1 | 5/2014 | Dary |
| 2014/0149180 A1 | 5/2014 | Yaseen |
| 2014/0164033 A1 | 6/2014 | Baskaran |
| 2014/0229511 A1* | 8/2014 | Tung ...................... G06F 16/22 |
| | | 707/803 |
| 2014/0349272 A1 | 11/2014 | Kutty |
| 2014/0358845 A1 | 12/2014 | Mundlapudi |
| 2015/0033217 A1 | 1/2015 | Mellor |
| 2015/0160969 A1 | 6/2015 | Kishore |
| 2015/0186481 A1 | 7/2015 | Mehra |
| 2015/0207758 A1* | 7/2015 | Mordani ................. H04L 47/78 |
| | | 709/226 |
| 2015/0213470 A1 | 7/2015 | Rush |
| 2015/0256475 A1 | 9/2015 | Suman |

(56) References Cited

U.S. PATENT DOCUMENTS

| | | |
|---|---|---|
| 2016/0070725 A1 | 3/2016 | Marrelli |
| 2016/0092059 A1 | 3/2016 | Tu |
| 2016/0224803 A1 | 8/2016 | Frank |
| 2016/0292192 A1 | 10/2016 | Bhagat |
| 2016/0292216 A1 | 10/2016 | Joshi |
| 2016/0306827 A1 | 10/2016 | Dos Santos |
| 2016/0314175 A1 | 10/2016 | Dhayapule |
| 2016/0314176 A1 | 10/2016 | Dhayapule |
| 2016/0328566 A1* | 11/2016 | Nellamakkada ...... G06F 16/254 |
| 2017/0004187 A1 | 1/2017 | Tung |
| 2017/0006135 A1 | 1/2017 | Siebel |
| 2017/0011087 A1 | 1/2017 | Hyde |
| 2017/0068595 A1 | 3/2017 | Nautiyal |
| 2017/0116295 A1 | 4/2017 | Wan |
| 2017/0161344 A1 | 6/2017 | Vasireddy |
| 2017/0249361 A1 | 8/2017 | Gordon |
| 2018/0012145 A1 | 1/2018 | Maurya |
| 2018/0032550 A1 | 2/2018 | Gupta |
| 2018/0039921 A1 | 2/2018 | Mos |
| 2018/0052898 A1 | 2/2018 | Allan |
| 2018/0060400 A1 | 3/2018 | Wu |
| 2018/0060402 A1 | 3/2018 | Fabjanski |
| 2018/0144314 A1 | 5/2018 | Miller |
| 2018/0150529 A1 | 5/2018 | McPherson |
| 2018/0167370 A1 | 6/2018 | Frahim |
| 2018/0329966 A1 | 11/2018 | Ranganathan |
| 2019/0042322 A1 | 2/2019 | Calhoun |
| 2019/0042988 A1 | 2/2019 | Brown |
| 2019/0114211 A1 | 4/2019 | Reddipalli |
| 2019/0287006 A1 | 9/2019 | Costabello |
| 2019/0294596 A1 | 9/2019 | Yan |
| 2019/0317972 A1 | 10/2019 | Patton |
| 2019/0349269 A1 | 11/2019 | Li |
| 2019/0370146 A1 | 12/2019 | Babu |
| 2020/0004863 A1 | 1/2020 | Kumar |
| 2020/0007631 A1 | 1/2020 | Greenstein |
| 2020/0012647 A1 | 1/2020 | Johnson, III |
| 2020/0081991 A1 | 3/2020 | Caputo |
| 2020/0104775 A1 | 4/2020 | Chintalapati |
| 2020/0334089 A1 | 10/2020 | Ramanathan |
| 2020/0334240 A1 | 10/2020 | Muralidhar |
| 2020/0334267 A1 | 10/2020 | Ramanathan |
| 2020/0334268 A1 | 10/2020 | Vasireddy |
| 2020/0334270 A1 | 10/2020 | Vasireddy |
| 2020/0334271 A1 | 10/2020 | Ramanathan |
| 2020/0334608 A1 | 10/2020 | Ramanathan |
| 2020/0349155 A1 | 11/2020 | Reinshagen |
| 2021/0049183 A1 | 2/2021 | Ramanathan |
| 2021/0342341 A1 | 11/2021 | Fujimaki |
| 2023/0252037 A1 | 8/2023 | Reinshagen |

FOREIGN PATENT DOCUMENTS

| | | |
|---|---|---|
| CN | 105915580 | 8/2016 |
| CN | 107015794 | 8/2017 |
| CN | 107464107 | 12/2017 |
| CN | 107516199 | 12/2017 |
| CN | 108701256 | 10/2018 |
| EP | 3352103 | 7/2018 |
| JP | 2003529119 | 9/2003 |
| JP | 2009146350 | 7/2009 |
| WO | 20140123565 | 8/2014 |

OTHER PUBLICATIONS

Intellectual Property India, Examination report under sections 12 & 13 of the Patent Act, 1970 and the Patents Rules, 2003 dated Apr. 2, 2024 for Indian Patent Application No. 202147016801 , 7 pages.
United States Patent and Trademark Office, Notice of Allowance and Fee(s) Due dated Apr. 1, 2024 for U.S. Appl. No. 17/855,933, 10 pages.
United States Patent and Trademark Office, Corrected Notice of Allowability dated Mar. 22, 2024 for U.S. Appl. No. 16/851,872 , 2 pages.
Japan Patent Office, Notice of Reasons for Refusal dated Mar. 15, 2024 for Japanese Patent Application No. 2021-551956 , 8 pages.
United States Patent and Trademark Office, Office Communication dated May 24, 2024 for U.S. Appl. No. 17/883,471 , 7 pages.
Zhou, Bowen and Buyya, Rajkumar, "Augmentation Techniques for Mobile Cloud Computing: A Taxonomy, Survey, and Future Directions", ACM Computing Surv. 51, 1, Article 13, Jan. 2018, 38 pages.
Janiesch, Christian et al., "Business Activity Management for Service Networks in Cloud Environments", Proceedings of the 6th Workshop on Middleware for Service Oriented Computing, Association for Computing Machinery, Article 2, Dec. 12, 2011, 6 pages.
European Patent Office, Communication pursuant to Article 94(3) EPC dated Apr. 26, 2024 for European Patent Application No. 20727046.3 , 7 pages.
Japan Patent Office, Notice of Reasons for Refusal dated Jun. 13, 2024 for Japanese Patent Application No. 2021-551582 , 12 pages.
Japan Patent Office, Notice of Reasons for Refusal dated Jun. 12, 2024 for Japanese Patent Application No. 2021-551572 , 6 pages.
United States Patent and Trademark Office, Office Communication dated Jul. 1, 2024 for U.S. Appl. No. 17/076,164 , 28 pages.
United States Patent and Trademark Office, Office Communication dated Nov. 7, 2023 for U.S. Appl. No. 18/137,306 , 20 pages.
United States Patent and Trademark Office, Notice of Allowance and Fee(s) Due dated Jul. 17, 2024 for U.S. Appl. No. 18/137,306, 19 pages.
United States Patent and Trademark Office, Notice of Allowance and Fee(s) Due dated Aug. 7, 2024 for U.S. Appl. No. 18/137,306, 4 pages.
China National Intellectual Property Administration, Notification of the First Office Action dated Sep. 24, 2024 for Chinese Application No. 202080006154.5 , 11 pages.
United States Patent and Trademark Office Office Communication dated Sep. 30, 2024 for U.S. Appl. No. 16/868,081 , 16 pages.
United States Patent and Trademark Office, Office Communication dated Oct. 31, 2023 for U.S. Appl. No. 17/855,933 , 23 pages.
United States Patent and Trademark Office, Office Communication dated Apr. 20, 2023 for U.S. Appl. No. 17/855,933 , 17 pages.
United States Patent and Trademark Office, Office Communication dated Mar. 20, 2023 for U.S. Appl. No. 17/883,471 , 20 pages.
United States Patent and Trademark Office, Office Communication dated Mar. 3, 2022 for U.S. Appl. No. 16/868,081 , 10 pages.
United States Patent and Trademark Office, Office Communication dated Dec. 8, 2022 for U.S. Appl. No. 16/868,081 , 14 pages.
United States Patent and Trademark Office, Office Communication dated Jun. 8, 2022 for U.S. Appl. No. 16/920,574 , 14 pages.
United States Patent and Trademark Office, Office Communication dated Jul. 31, 2023 for U.S. Appl. No. 17/076,164 , 29 pages.
United States Patent and Trademark Office, Office Communication dated Jan. 31, 2023 for U.S. Appl. No. 17/076,164 , 26 pages.
United States Patent and Trademark Office, Office Communication dated Aug. 15, 2022 for U.S. Appl. No. 17/076,164 , 15 pages.
United States Patent and Trademark Office, Notice of Allowance and Fee(s) Due dated Dec. 13, 2022 for U.S. Appl. No. 16/853,428, 10 pages.
United States Patent and Trademark Office, Office Communication dated Jun. 17, 2022 for U.S. Appl. No. 16/853,428 , 21 pages.
United States Patent and Trademark Office, Office Communication dated Mar. 13, 2023 for U.S. Appl. No. 16/851,872 , 28 pages.
United States Patent and Trademark Office, Office Communication dated Jun. 27, 2022 for U.S. Appl. No. 16/851,872 , 29 pages.
United States Patent and Trademark Office, Office Communication dated Dec. 9, 2021 for U.S. Appl. No. 16/851,872 , 21 pages.
"Cross-tenant analytics using extracted data—single-tenant app", published Dec. 18, 2018, retrieved from https://docs.microsoft.com/en-us/azure/sql-database/saas-tenancy-tenant-analytics on Dec. 5, 2019, 15 pages.
"ETL Validator: Key Features", retrieved from https://www.datagaps.com/etl-testing-tools/etl-validator/ on Nov. 27, 2019, 2 pages.
Gawande, Sandesh; "ETL Strategy for the Enterprise: ETL Startegy to store data validation rules", ETLGuru, retrieved from http://etlguru.com/?p=22 on Nov. 27, 2019, 2 pages.

(56) References Cited

OTHER PUBLICATIONS

Homayouni, Hajar; "An Approach for Testing the Extract-Transform-Load Process in Data Warehouse Systems", Thesis, Fall 2017, Colorado State University, 96 pages.

Kim, et al., "A Component-Based Architecture for Preparing Data in Data Warehousing", Jun. 2000, retrieved from https://www.researchgate.net/profile/Eui_Hong2/publication/2466873_A_Component-Based_Architecture_for_Preparing_Data_in_Data_Warehousing/links/541be8930cf25ebee98dac5c/A-Component-Based-Architecture-for-Preparing-Data-in-Data-Warehousing.pdf, 8 pages.

"Making cloud ETL routines work", The Chartered Institute for IT, published Sep. 6, 2017, retrieved from https://www.bcs.org/content-hub/making-cloud-etl-routines-work/ on Dec. 5, 2019, 4 pages.

Ong, et al., "Dynamic-ETL: a hybrid approach for health data extraction, transformation and loading", published on Sep. 13, 2017, retrieved from https://www.ncbi.nlm.nih.gov/pmc/articles/PMC5598056/ on Nov. 27, 2019, 10 pages.

Subash, Muthiah; "An Approach to Multi-Tenant Customer Data Isolation Using SQL Server and Tableau 8.1", published Jun. 18, 2014, retrieved from https://www.credera.com/blog/business-intelligence/approach-multi-tenant-customer-data-isolation-using-sql-server-tableau-8-1/, 6 pages.

"Use Power BI with SQL Data Warehouse", Engineering ME366, Boston University Academy, retrieved from https://www.coursehero.com/file/p25tovsh/Scored-Labels-the-classification-done-by-the-model-bike-buyer-1-or-not-0-This/ on Nov. 27, 2019, 1 page.

Dageville, Benoit et al., "The Snowflake Elastic Data Warehouse" Snowflake Computing; ACM 2016, SIGMOD/PODS '16 Jun. 26-Jul. 1, 2016, San Francisco, CA, © 2016, pp. 215-226.

Ganapathi, Archana et al., "Statistics-Driven Workload Modeling for the Cloud", ICDE Workshops 2010, © 2010 IEEE, pp. 87-92.

Tu, Yingying and Guo Chaozhen "An Intelligent ETL Workflow Framework based on data Partition", IEEE 2010, © 2010, pp. 358-363.

Albrecht, Alexander and Naumann, Felix; "Managing ETL Processes" VLDB '08, Aug. 24-30, 2008, Auckland, New Zealand, © 2008 VLDB Endowment, ACM, 4 pages.

Schneider, Erich et al., "Sap Hana® Platform—Technical Overview: Driving Innovations in IT and in Business with In-Memory Computing Technology", Feb. 21, 2012, 20 pages.

Shukla, Anshu; Chaturvedi, Shilpa and Simmhan, Yogesh "RIotBench: A Real-time IoT Benchmark for Distributed Stream Processing Platforms", 34 pages, Jan. 2017, <https://arxiv.org/abs/1701.08530v1>.

Oracle, "Fusion Middleware Developing Integration Projects with Oracle Data Integrator 12c (12.2.1.1)", May 2016, 340 pages.

Oracle, "Fusion Middleware Developing Integration Projects with Oracle Data Integrator—Overview of Oracle Data Integrator Topology", 4 pages, retrieved on Oct. 20, 2022 from: <https://docs.oracle.com/middleware/12211/odi/develop/setup_topology.htm#ODIDG171>.

Domingues, Marcos Aurelio, "An Independent Platform for the Monitoring, Analysis and Adaptation of Web Sites", Proceedings of the 2008 SCM conference on Recommender systems, Oct. 2008, pp. 299-302.

United States Patent and Trademark Office, Office Communication dated Sep. 21, 2021 for U.S. Appl. No. 16/852,070, 17 pages.

United States Patent and Trademark Office, Office Communication dated Feb. 22, 2022 for U.S. Appl. No. 16/852,070, 22 pages.

United States Patent and Trademark Office, Notice of Allowance and Fee(s) Due dated Oct. 20, 2022 for U.S. Appl. No. 16/852,070, 10 pages.

United States Patent and Trademark Office, Office Communication dated May 11, 2022 for U.S. Appl. No. 16/862,394, 19 pages.

United States Patent and Trademark Office, Notice of Allowance and Fee(s) Due dated Sep. 2, 2022 for U.S. Appl. No. 16/862,394, 9 pages.

United States Patent and Trademark Office, Notice of Allowance and Fee(s) Due dated Dec. 29, 2022 for U.S. Appl. No. 16/862,394, 8 pages.

United States Patent and Trademark Office, Office Communication dated Aug. 19, 2021 for U.S. Appl. No. 16/862,394, 15 pages.

European Patent Office, Notification of Transmittal of The International Search Report and The Written Opinion of The International Searching Authority, or The Declaration dated Jul. 6, 2020 for International Patent Application No. PCT/US2020/030547, 11 pages.

United States Patent and Trademark Office, Notice of Allowance and Fee(s) Due dated Jul. 26, 2023 for U.S. Appl. No. 16/851,869, 9 pages.

Intellectual Property India, Examination report under sections 12 & 13 of the Patents Act, 1970 and the Patents Rules, 2003, dated Aug. 10, 2023 for India Patent Application No. 202147016705, 9 pages.

United States Patent and Trademark Office, Office Communication dated Aug. 23, 2023 for U.S. Appl. No. 16/920,574, 16 pages.

Ramesh, S. M. and Gomathy, B. "Review on Scheduling Algorithms for Data Warehousing" International Journal of Science and Research (IJSR), vol. 3 Issue 9, Sep. 2014, 6 pages.

United States Patent and Trademark Office, Office Communication dated Sep. 15, 2023 for U.S. Appl. No. 17/883,471, 6 pages.

United States Patent and Trademark Office, Office Communication dated Nov. 28, 2023 for U.S. Appl. No. 17/076,164, 30 pages.

United States Patent and Trademark Office, Notice of Allowance and Fee(s) Due dated Dec. 15, 2023 for U.S. Appl. No. 16/851,872, 7 pages.

United States Patent and Trademark Office, Office Communication dated Jan. 5, 2024 for U.S. Appl. No. 16/868,081, 19 pages.

United States Patent and Trademark Office, Office Communication dated Feb. 8, 2024 for U.S. Appl. No. 16/920,574, 17 pages.

European Patent Office, Communication pursuant to Article 94(3) EPC dated Jan. 3, 2024 for European Patent Application No. 20728321.9, 9 pages.

China National Intellectual Property Administration, Notification of Second Office Action dated Dec. 6, 2024 for Chinese Patent Application No. 202080006154.5, 12 pages.

United States Patent and Trademark Office, Notice of Allowance and Fee(s) Due dated Dec. 6, 2024 for U.S. Appl. No. 17/883,471, 10 pages.

United States Patent and Trademark Office, Notice of Allowance and Fee(s) Due dated Aug. 5, 2024 for U.S. Appl. No. 17/883,471, 9 pages.

Japan Patent Office, Decision to Grant a Patent dated Nov. 28, 2024 for Japanese Patent Application No. 2021-551582, 5 pages.

Japan Patent Office, Decision to Grant a Patent dated Nov. 27, 2024 for Japanese Patent Application No. 2021-551572, 5 pages.

China National Intellectual Property Administration, Notification of Allowance dated Feb. 21, 2025 for Chinese Patent Application No. 202080006154.5, 2 pages.

United States Patent and Trademark Office, Notice of Allowance and Fee(s) Due dated Jan. 22, 2025 for U.S. Appl. No. 17/076,164, 9 pages.

China National Intellectual Property Administration, Notification of the Second Office Action dated Aug. 28, 2025 for Chinese Patent Application No. 202080006153.0, 6 pages.

United States Patent and Trademark Office, Office Communication dated Apr. 10, 2025 for U.S. Appl. No. 18/632,114, 27 pages.

United States Patent and Trademark Office, Notice of Allowance and Fee(s) Due dated Apr. 28, 2025 for U.S. Appl. No. 16/868,081, 15 pages.

China National Intellectual Property Administration, Notification of the First Office Action dated Apr. 23, 2025 for Chinese Patent Application No. 202080006153.0, 8 pages.

China National Intellectual Property Administration, Notification of the First Office Action dated May 20, 2025 for Chinese Patent Application No. 202080006157.9, 10 pages.

United States Patent and Trademark Office, Office Communication dated Oct. 1, 2025 for U.S. Appl. No. 19/194,471, 20 pages.

* cited by examiner

SYSTEM AND METHOD FOR DATA ANALYTICS WITH AN ANALYTIC APPLICATIONS ENVIRONMENT

CLAIM OF PRIORITY

This application is a continuation of U.S. Patent Application titled "SYSTEM AND METHOD FOR DATA ANALYTICS WITH AN ANALYTIC APPLICATIONS ENVIRONMENT", application Ser. No. 18/137,306 filed Apr. 20, 2023; which is a continuation of U.S. Patent Application titled "SYSTEM AND METHOD FOR DATA ANALYTICS WITH AN ANALYTIC APPLICATIONS ENVIRONMENT", application Ser. No. 16/862,394, filed Apr. 29, 2020, and subsequently issued as U.S. Pat. No. 11,640,406 on May 2, 2023; which application claims the benefit of priority to U.S. Provisional Patent Application titled "SYSTEM AND METHOD FOR USE OF SCHEMAS WITH AN ANALYTIC APPLICATIONS ENVIRONMENT AND DATA WAREHOUSE", Application No. 62/841,093, filed Apr. 30, 2019, and U.S. Provisional Patent Application titled "SYSTEM AND METHOD FOR PROVIDING AN ANALYTIC APPLICATIONS ENVIRONMENT", Application No. 62/885,118, filed Aug. 9, 2019; each of which above applications and the contents thereof are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to computer data analytics, and computer-based methods of providing business intelligence data, and are particularly related to systems and methods for providing an analytic applications environment that enables the development of software analytic applications, for use with enterprise software application or data environments.

BACKGROUND

Generally described, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example, an Oracle Fusion Applications environment or other type of enterprise software application or data environment; or within the context of a software-as-a-service (SaaS) or cloud environment, such as, for example, an Oracle Analytics Cloud or Oracle Cloud Infrastructure environment, or other type of cloud environment.

SUMMARY

In accordance with an embodiment, an analytic applications environment enables data analytics within the context of an organization's enterprise software application or data environment, or a software-as-a-service or other type of cloud environment; and supports the development of computer-executable software analytic applications.

In accordance with an embodiment, a data pipeline or process, such as, for example, an extract, transform, load process, can operate in accordance with an analytic applications schema adapted to address particular analytics use cases or best practices, to receive data from a customer's (tenant's) enterprise software application or data environment, for loading into a data warehouse instance.

In accordance with an embodiment, each customer (tenant) can additionally be associated with a customer tenancy and a customer schema. The data pipeline or process populates their data warehouse instance and database tables with data as received from their enterprise software application or data environment, as defined by a combination of the analytic applications schema, and their customer schema.

DETAILED DESCRIPTION

Figure 1:
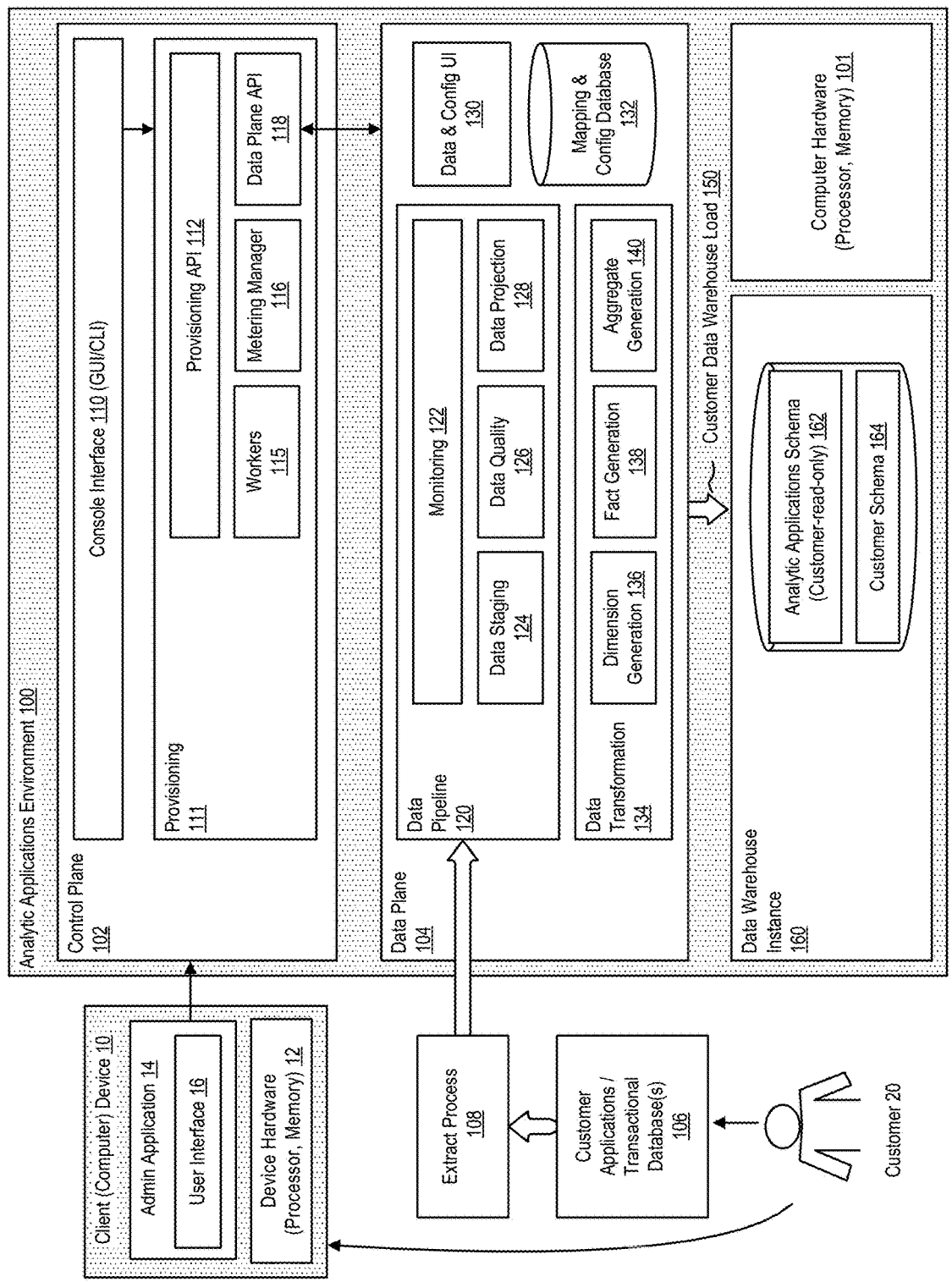
FIG. 1 illustrates a system for providing an analytic applications environment, in accordance with an embodiment.

As described above, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example, an Oracle Fusion Applications environment or other type of enterprise software application or data environment; or within the context of a software-as-a-service (SaaS) or cloud environment, such as, for example, an Oracle Analytics Cloud or Oracle Cloud Infrastructure environment, or other type of cloud environment.

In accordance with an embodiment, an analytic applications environment enables data analytics within the context of an organization's enterprise software application or data environment, or a software-as-a-service or other type of cloud environment; and supports the development of computer-executable software analytic applications.

In accordance with an embodiment, a data pipeline or process, such as, for example, an extract, transform, load process, can operate in accordance with an analytic applications schema adapted to address particular analytics use cases or best practices, to receive data from a customer's (tenant's) enterprise software application or data environment, for loading into a data warehouse instance.

In accordance with an embodiment, each customer (tenant) can additionally be associated with a customer tenancy and a customer schema. The data pipeline or process populates their data warehouse instance and database tables with data as received from their enterprise software application or data environment, as defined by a combination of the analytic applications schema, and their customer schema.

In accordance with an embodiment, a technical advantage of the described systems and methods includes that the use of a system-wide or shared analytic applications schema or data model, maintained within an analytic applications environment (cloud) tenancy; together with tenant-specific customer schemas, maintained within customer tenancies; enables each customer's (tenant's) data warehouse instance, or database tables, to be populated or otherwise associated with live data (live tables), as received from their enterprise software application or data environment, on an automated or a periodic, e.g., hourly/daily/weekly, or other basis, and reflecting best practices for particular analytics use cases. Examples of such analytics use cases can include Enterprise Resource Planning (ERP), Human Capital Management (HCM), Customer Experience (CX), Supply Chain Management (SCM), Enterprise Performance Management (EPM), or other types of analytics use cases. The populated data warehouse instance or database tables can then be used to create computer-executable software analytic applications, or to determine data analytics or other information associated with the data.

In accordance with an embodiment, a computer-executable software analytic application can be associated with a data pipeline or process, such as, for example, an extract, transform, load (ETL) process, or an extract, load, transform (ELT) process, maintained by a data integration component, such as, for example, an Oracle Data Integrator (ODI) environment, or other type of data integration component.

In accordance with an embodiment, the analytic applications environment can operate with a data warehouse environment or component, such as, for example, an Oracle Autonomous Data Warehouse (ADW), Oracle Autonomous Data Warehouse Cloud (ADWC), or other type of data warehouse environment or component adapted to store large amounts of data; which can be populated via a star schema sourced from an enterprise software application or data environment, such as, for example, an Oracle Fusion Applications, or other type of enterprise software application or data environment. The data made available to each customer (tenant) of the analytic applications environment can be provisioned in an, e.g., ADWC, tenancy that is associated with, and accessible only to, that customer (tenant); while providing access to other features of a shared infrastructure.

For example, in accordance with an embodiment, the analytic applications environment can include a data pipeline or process layer that enables a customer (tenant) to ingest data extracted from their Oracle Fusion Applications environment, to be loaded into a data warehouse instance within their ADWC tenancy, including support for features such as multiple data warehouse schemas, data extract and target schemas, and monitoring of data pipeline or process stages; coupled with a shared data pipeline or process infrastructure that provides common transformation maps or repositories.

Introduction

In accordance with an embodiment, a data warehouse environment or component, such as, for example, an Oracle Autonomous Data Warehouse (ADW), Oracle Autonomous Data Warehouse Cloud (ADWC), or other type of data warehouse environment or component adapted to store large amounts of data, can provide a central repository for storage of data collected by one or more business applications.

For example, in accordance with an embodiment, the data warehouse environment or component can be provided as a multi-dimensional database that employs online analytical processing (OLAP) or other techniques to generate business-related data from multiple different sources of data. An organization can extract such business-related data from one or more vertical and/or horizontal business applications, and inject the extracted data into a data warehouse instance that is associated with that organization, Examples of horizontal business applications can include ERP, HCM, CX, SCM, and EPM, as described above, and provide a broad scope of functionality across various enterprise organizations.

Vertical business applications are generally narrower in scope that horizontal business applications, but provide access to data that is further up or down a chain of data within a defined scope or industry. Examples of vertical business applications can include medical software, or banking software, for use within a particular organization.

Although software vendors increasingly offer enterprise software products or components as SaaS or cloud-oriented offerings, such as, for example, Oracle Fusion Applications; while other enterprise software products or components, such as, for example, Oracle ADWC, can be offered as one or more of SaaS, platform-as-a-service (PaaS), or hybrid subscriptions; enterprise users of conventional business intelligence (BI) applications and processes generally face the task of extracting data from their horizontal and vertical business applications, and introducing the extracted data into a data warehouse-a process which can be both time and resource intensive.

In accordance with an embodiment, the analytic applications environment allows customers (tenants) to develop computer-executable software analytic applications for use with a BI component, such as, for example, an Oracle Business Intelligence Applications (OBIA) environment, or other type of BI component adapted to examine large amounts of data sourced either by the customer (tenant) itself, or from multiple third-party entities.

For example, in accordance with an embodiment, when used with a SaaS business productivity software product suite that includes a data warehouse component, the analytic applications environment can be used to populate the data warehouse component with data from the business productivity software applications of the suite. Predefined data integration flows can automate the ETL processing of data between the business productivity software applications and the data warehouse, which processing might have been conventionally or manually performed by the users of those services.

As another example, in accordance with an embodiment, the analytic applications environment can be pre-configured with database schemas for storing consolidated data sourced across various business productivity software applications of a SaaS product suite. Such pre-configured database schemas can be used to provide uniformity across the productivity software applications and corresponding transactional databases offered in the SaaS product suite; while allowing the user to forgo the process of manually designing, tuning, and modeling the provided data warehouse.

As another example, in accordance with an embodiment, the analytic applications environment can be used to pre-populate a reporting interface of a data warehouse instance with relevant metadata describing business-related data objects in the context of various business productivity software applications, for example, to include predefined dashboards, key performance indicators (KPIs), or other types of reports.

Analytic Applications Environment

FIG. 1 illustrates a system for providing an analytic applications environment, in accordance with an embodiment.

As illustrated in FIG. 1, in accordance with an embodiment, an analytic applications environment 100 can be provided by, or otherwise operate at, a computer system having a computer hardware (e.g., processor, memory) 101, and including one or more software components operating as a control plane 102, and a data plane 104, and providing access to a data warehouse, or data warehouse instance 160.

In accordance with an embodiment, the components and processes illustrated in FIG. 1, and as further described herein with regard to various other embodiments, can be provided as software or program code executable by a computer system or other type of processing device.

For example, in accordance with an embodiment, the components and processes described herein can be provided by a cloud computing system, or other suitably-programmed computer system.

In accordance with an embodiment, the control plane operates to provide control for cloud or other software products offered within the context of a SaaS or cloud environment, such as, for example, an Oracle Analytics Cloud or Oracle Cloud Infrastructure environment, or other type of cloud environment.

For example, in accordance with an embodiment, the control plane can include a console interface 110 that enables access by a client computer device 10 having a device hardware 12, administrative application 14, and user interface 16, under control of a customer (tenant) 20 and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants).

For example, in accordance with an embodiment, the console interface can provide interfaces that allow customers to provision services for use within their SaaS environment, and to configure those services that have been provisioned.

In accordance with an embodiment, the provisioning component can include various functionality to provision services that are specified by provisioning commands.

For example, in accordance with an embodiment, the provisioning component can be accessed and utilized, via the console interface, by a customer (tenant) to purchase one or more of a suite of business productivity software applications, together with a data warehouse instance for use with those software applications.

In accordance with an embodiment, a customer (tenant) can request the provisioning of a customer schema 164 within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

In accordance with an embodiment, the provisioning component can also comprise a provisioning application programming interface (API) 112, a number of workers 115, a metering manager 116, and a data plane API 118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane.

For example, in accordance with an embodiment, provisioning and configuration changes directed to services provided by the data plane can be communicated to the data plane via the data plane API.

In accordance with an embodiment, the metering manager can include various functionality that meters services and usage of services provisioned through control plane.

For example, in accordance with an embodiment, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example, a knowledge model (KM), or other type of data model, that the system uses to transform the transactional data received from business applications and corresponding transactional databases provisioned in the SaaS environment, into a model format understood by the analytic applications environment. The model format can be provided in any data format suited for storage in a data warehouse.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default analytic applications schema (referred to herein in accordance with some embodiments as an analytic warehouse schema) 162 and, for each customer (tenant) of the system, a customer schema as described above.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the analytic applications schema, which can be updated by a data pipeline or process, for example, an ETL process, on a periodic or other basis.

In accordance with an embodiment, to support multiple tenants, the system can enable the use of multiple data warehouses or data warehouse instances.

For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data.

For example, in accordance with an embodiment, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

As described above, in accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, based on the data model defined in the mapping and configuration database, the monitoring component can determine dependencies of several different data sets to be transformed. Based on the determined dependencies, the monitoring component can determine which of several different data sets should be transformed to the model format first.

For example, in accordance with an embodiment, if a first model dataset incudes no dependencies on any other model data set; and a second model data set includes dependencies to the first model data set; then the monitoring component can determine to transform the first data set before the second data set, to accommodate the second data set's dependencies on the first data set.

In accordance with an embodiment, the data transformation layer can transform extracted data into a format suitable for loading into a customer schema of data warehouse, for example according to the data model as described above. During the transformation, the data transformation can perform dimension generation, fact generation, and aggregate generation, as appropriate. Dimension generation can include generating dimensions or fields for loading into the data warehouse instance.

For example, in accordance with an embodiment, dimensions can include categories of data such as, for example, "name," "address," or "age". Fact generation includes the generation of values that data can take, or "measures." Facts are associated with appropriate dimensions in the data warehouse instance. Aggregate generation includes creation of data mappings which compute aggregations of the transformed data to existing data in the customer schema 164 of data warehouse instance.

In accordance with an embodiment, once any transformations are in place (as defined by the data model), the data pipeline or process can read the source data, apply the transformation, and then push the data to the data warehouse instance.

In accordance with an embodiment, data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Horizontally and vertically integrated business software applications are generally directed to capturing of data in real time. This is a result of horizontally and vertically integrated business software applications being generally used for daily workflow, and storing data in a transactional database, which means that only the most current data is generally stored in such databases.

For example, while a HCM application might update a record associated with an employee when the employee transfers offices, such HCM application would generally not maintain a record of each office that the employee had worked in during their tenure with a company. As such, a BI-related query seeking to determine employee mobility within a company would not have adequate records within the transaction database to complete such a query.

In accordance with an embodiment, by storing historical, in addition to current data, generated by the horizontally and vertically integrated business software applications, in a context that is readily understandable by BI applications, the data warehouse instance as populated using the above technique provides a resource for BI applications to process such queries, using an interface provided, for example, by a business productivity and analytics product suite, or by a SQL tool of the customer's choice.

Data Pipeline Process

Figure 2:
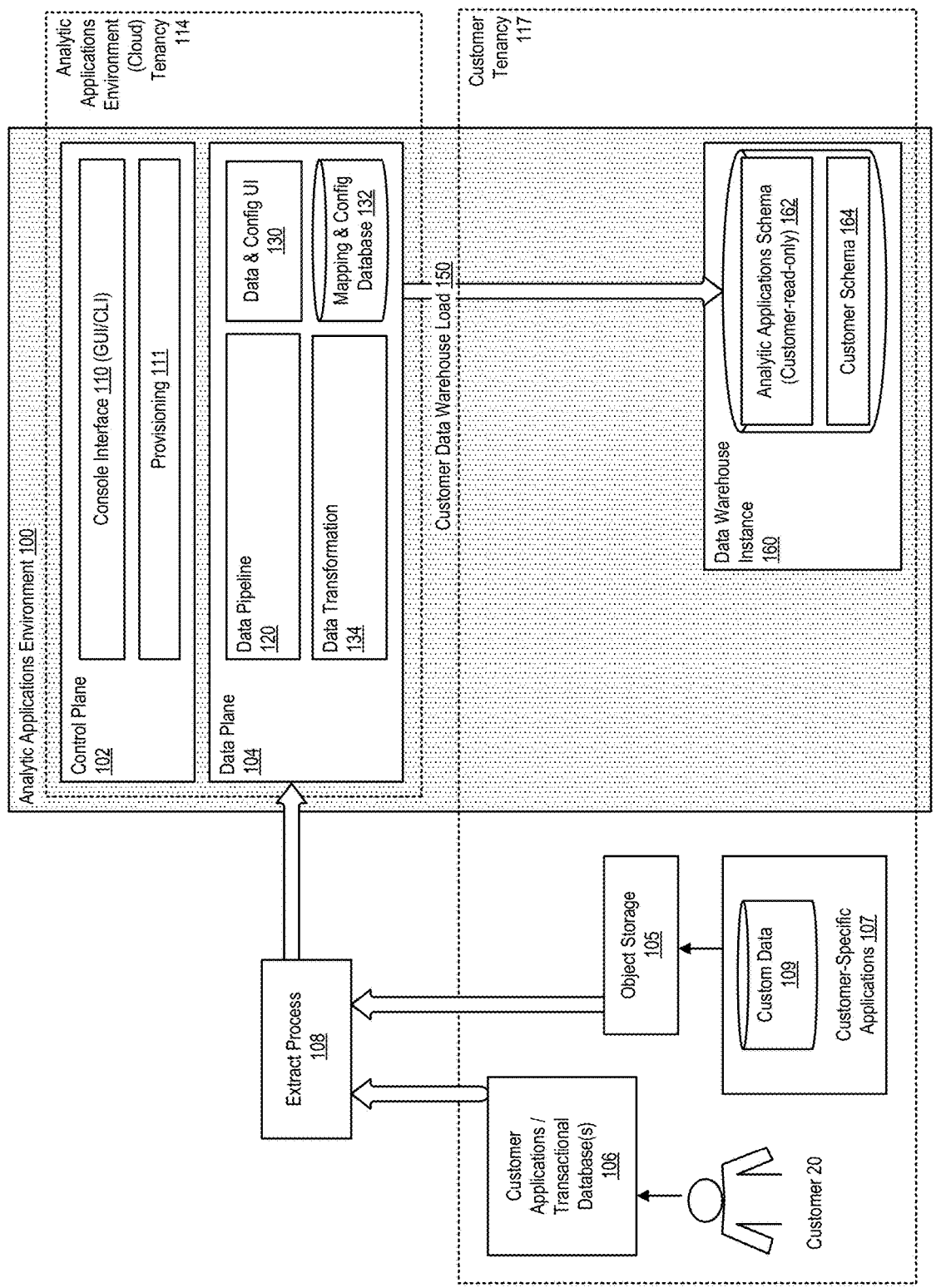
FIG. 2 further illustrates a system for providing an analytic applications environment, in accordance with an embodiment.

FIG. 2 further illustrates a system for providing an analytic applications environment, in accordance with an embodiment.

As illustrated in FIG. 2, in accordance with an embodiment, data can be sourced, e.g., from a customer's (tenant's) enterprise software application or data environment (106), using the data pipeline process as described above; or as custom data 109 sourced from one or more customer-specific applications 107; and loaded to a data warehouse instance, including in some examples the use of an object storage 105 for storage of the data.

In accordance with an embodiment, the data pipeline or process maintains, for each customer (tenant), an analytic applications schema, e.g., as a star schema, that is updated on a periodic or other basis, by the system in accordance with best practices for a particular analytics use case, e.g., human capital management (HCM) analytics, or enterprise resource planning (ERP) analytics.

In accordance with an embodiment, for each customer (tenant), the system uses the analytic applications schema that is maintained and updated by the system, within an analytic applications environment (cloud) tenancy 114, to pre-populate a data warehouse instance for the customer, based on an analysis of the data within that customer's enterprise applications environment, and within a customer tenancy 117. As such, the analytic applications schema maintained by the system enables data to be retrieved, by the data pipeline or process, from the customer's environment, and loaded to the customer's data warehouse instance in a "live" manner.

In accordance with an embodiment, the analytic applications environment also provides, for each customer of the environment, a customer schema that is readily modifiable by the customer, and which allows the customer to supplement and utilize the data within their own data warehouse instance. For each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics For example, in accordance with an embodiment, a data warehouse (e.g., an Oracle Autonomous Data Warehouse, ADWC) can include an analytic applications schema and, for each customer/tenant, a customer schema sourced from their enterprise software application or data environment. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Extraction, Transformation, Load/Publish

Figure 3:
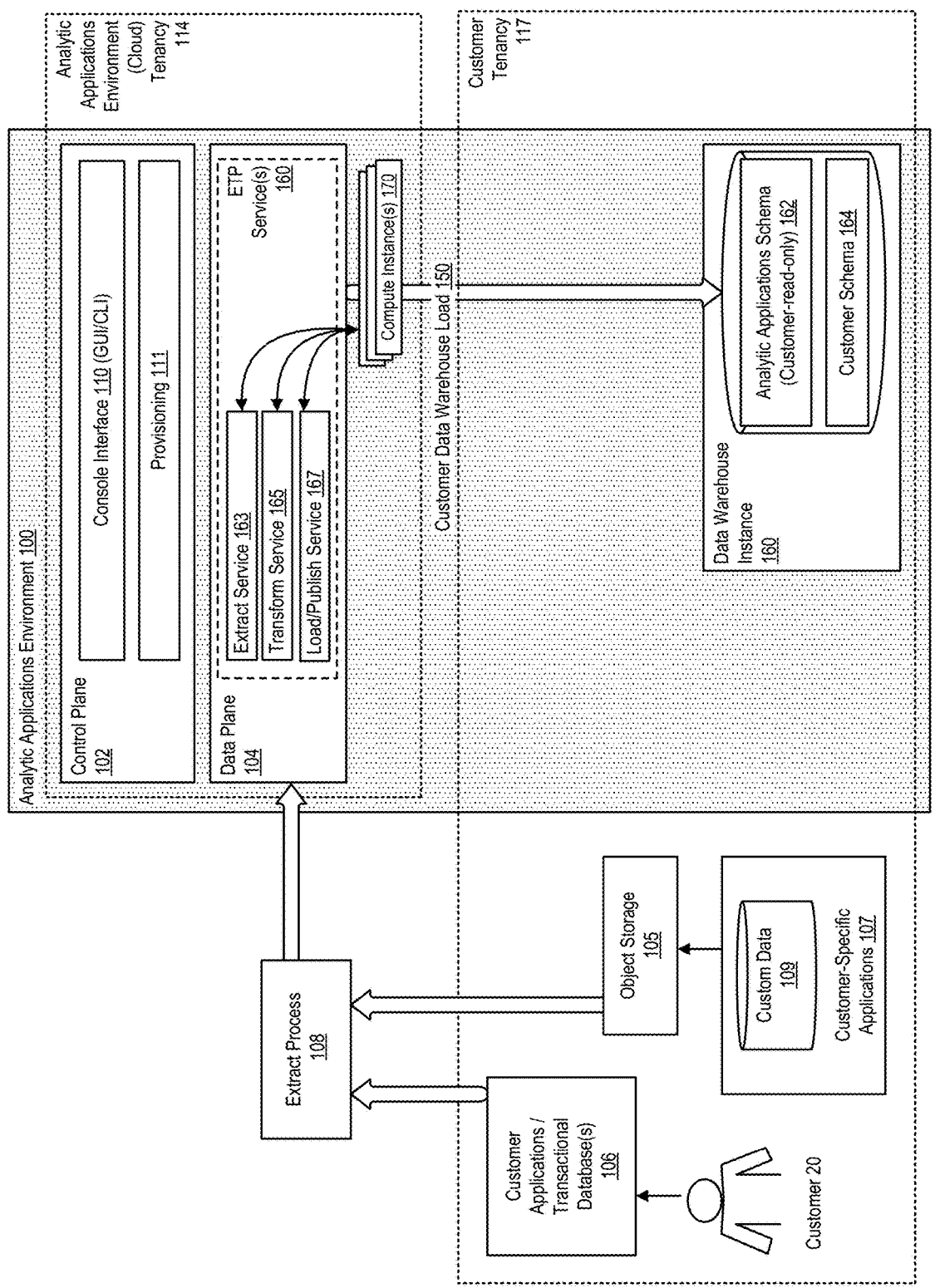
FIG. 3 further illustrates a system for providing an analytic applications environment, in accordance with an embodiment.

FIG. 3 further illustrates a system for providing an analytic applications environment, in accordance with an embodiment.

As illustrated in FIG. 3, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

Extraction: in accordance with an embodiment, a list of view objects for extractions can be submitted, for example, to an Oracle BI cloud connector (BICC) component via a ReST call. The extracted files can be uploaded to an object storage component, such as, for example, an Oracle Storage Service (OSS) component, for storage of the data.

Transformation: In accordance with an embodiment, the transformation process takes the data files from object storage component (e.g., OSS), and applies a business logic while loading them to a target data warehouse, e.g., an ADWC database, which is internal to the data pipeline or process, and is not exposed to the customer (tenant).

Load/Publish: In accordance with an embodiment, a load/publish service or process takes the data from the, e.g., ADWC database or warehouse, and publishes it to a data warehouse instance that is accessible to the customer (tenant).

Multiple Customers (Tenants)

Figure 4:
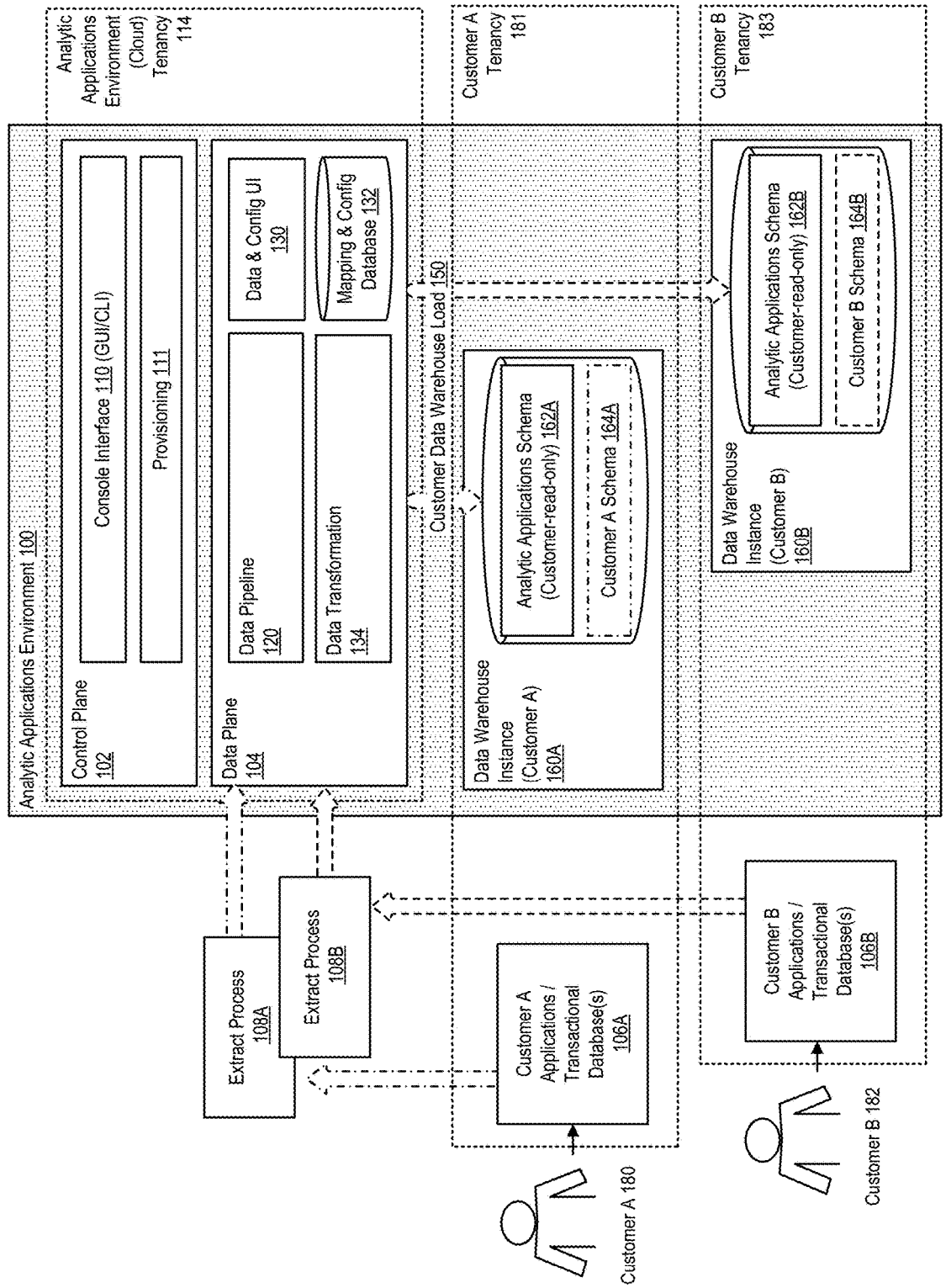
FIG. 4 further illustrates a system for providing an analytic applications environment, in accordance with an embodiment.

FIG. 4 further illustrates a system for providing an analytic applications environment, in accordance with an embodiment.

As illustrated in FIG. 4, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, an analytic applications schema that is updated on a periodic or other basis, by the system in accordance with best practices for a particular analytics use case.

In accordance with an embodiment, for each of a plurality of customers (e.g., customers A, B), the system uses the analytic applications schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the analytic applications environment also provides, for each of a plurality of customers of the environment, a customer schema (e.g., customer A schema 164A, customer B schema 164B) that is readily modifiable by the customer, and which allows the customer to supplement and utilize the data within their own data warehouse instance.

As described above, in accordance with an embodiment, for each of a plurality of customers of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

Activation Plans

Figure 5:
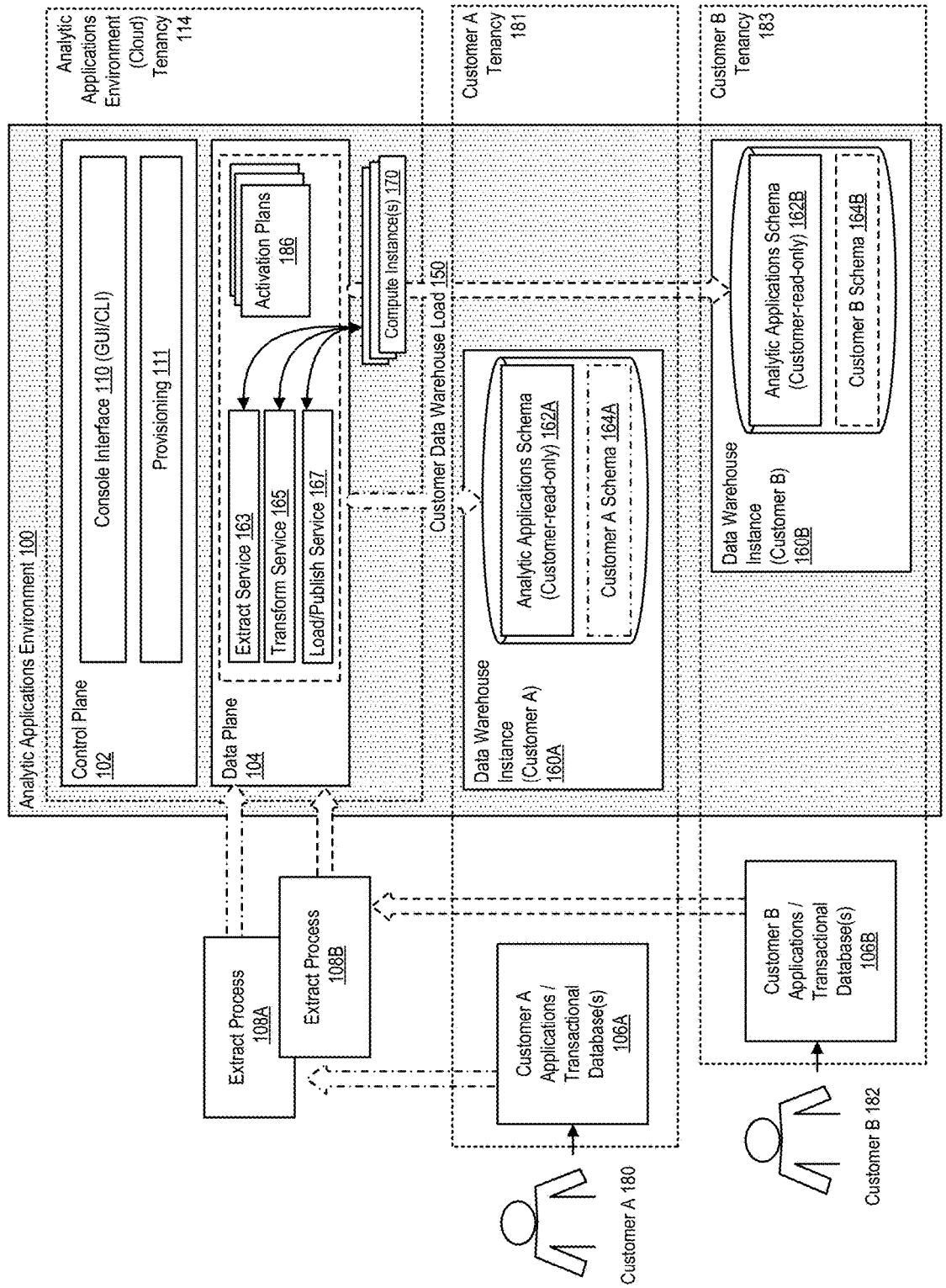
FIG. 5 further illustrates a system for providing an analytic applications environment, in accordance with an embodiment.

FIG. 5 further illustrates a system for providing an analytic applications environment, in accordance with an embodiment.

In accordance with an embodiment, activation plans 186 can be used to control the operation of the data pipeline or process services for a customer, for a particular functional area, to address that customer's (tenant's) particular needs.

For example, in accordance with an embodiment, an activation plan can define a number of extract, transform, and load (publish) services or steps to be run in a certain order, at a certain time of day, and within a certain window of time.

In accordance with an embodiment, each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

In accordance with an embodiment, activation plans can be stored in the mapping and configuration database and are customizable by the customer via the data and configuration UI. Each customer can have a number of activation plans. Compute instances/services (virtual machines) which execute the ETL process for various customers, according to their activation plans, can be dedicated to a particular service for the use of an activation plan, and then released for use by other services and activation plans.

In accordance with an embodiment, based on a determination of historical performance data recorded over a period of time, the system can optimize the execution of activation plans, e.g., for one or more functional areas associated with a particular tenant, or across a sequence of activation plans associated with multiple tenants, to address utilization of the VMs and service level agreements (SLAs) for those tenants. Such historical data can include statistics of load volumes and load times.

For example, in accordance with an embodiment, the historical data can include size of extraction, count of extraction, extraction time, size of warehouse, transform time, publish (load) time, view object extract size, view object extract record count, view object extract time, warehouse table count, count of records processed for a table, warehouse table transform time, publish table count, and publish time. Such historical data can be used to estimate and plan current and future activation plans in order to organize various tasks to, such as, for example, run in sequence or in parallel to arrive at a minimum time to run an activation plan. In addition, the gathered historical data can be used to optimize across multiple activation plans for a tenant. In some embodiments, the optimization of activation plans (i.e., a particular sequence of jobs, such as ETLs) based upon historical data can be automatic.

ETL Process Flow

Figure 6:
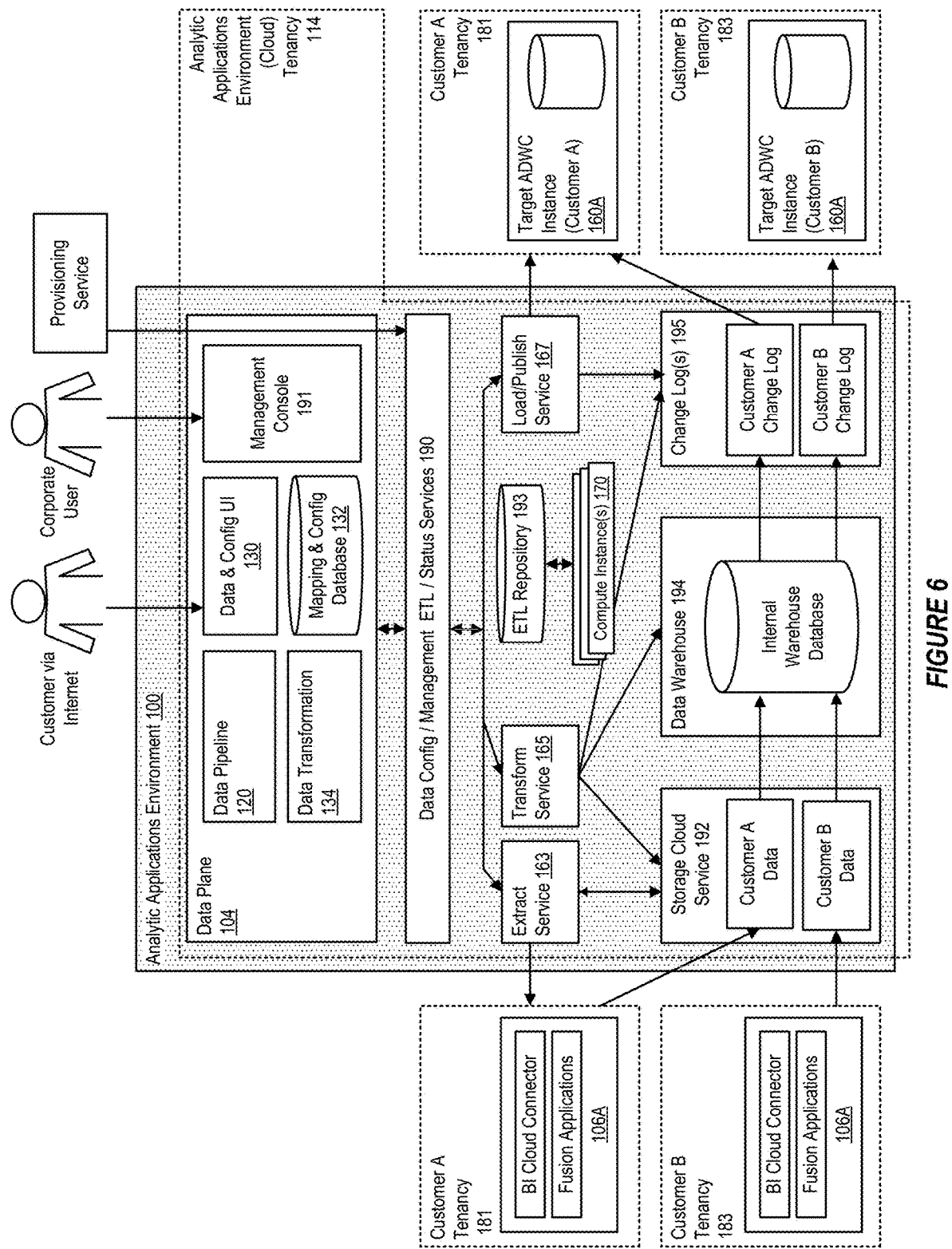
FIG. 6 further illustrates a system for providing an analytic applications environment, in accordance with an embodiment.

FIG. 6 further illustrates a system for providing an analytic applications environment, in accordance with an embodiment.

As illustrated in FIG. 6, in accordance with an embodiment, the system enables a flow of data, controlled by a data config/management/ETL//status services 190 within an (e.g., Oracle) managed tenancy, from each customer's enterprise software application environment (e.g., their Fusion Applications environment), including in this example, a BICC component, via a storage cloud service 192, e.g., OSS, and from there to a data warehouse instance.

As described above, in accordance with an embodiment, the flow of data can be managed by one or more services, including for example, an extract service, and a transform service as described above, and with reference to an ETL repository 193, that takes the data from the storage cloud service, and loads the data into an internal target data warehouse (e.g., an ADWC database) 194, which is internal to the data pipeline or process and is not exposed to the customer.

In accordance with an embodiment, data is moved in stages into the data warehouse, and thereafter into database table change logs 195, from where the load/publish service can load the customer data into a target data warehouse instance associated with and accessible by the customer, within its customer tenancy.

ETL Stages

Figure 7:
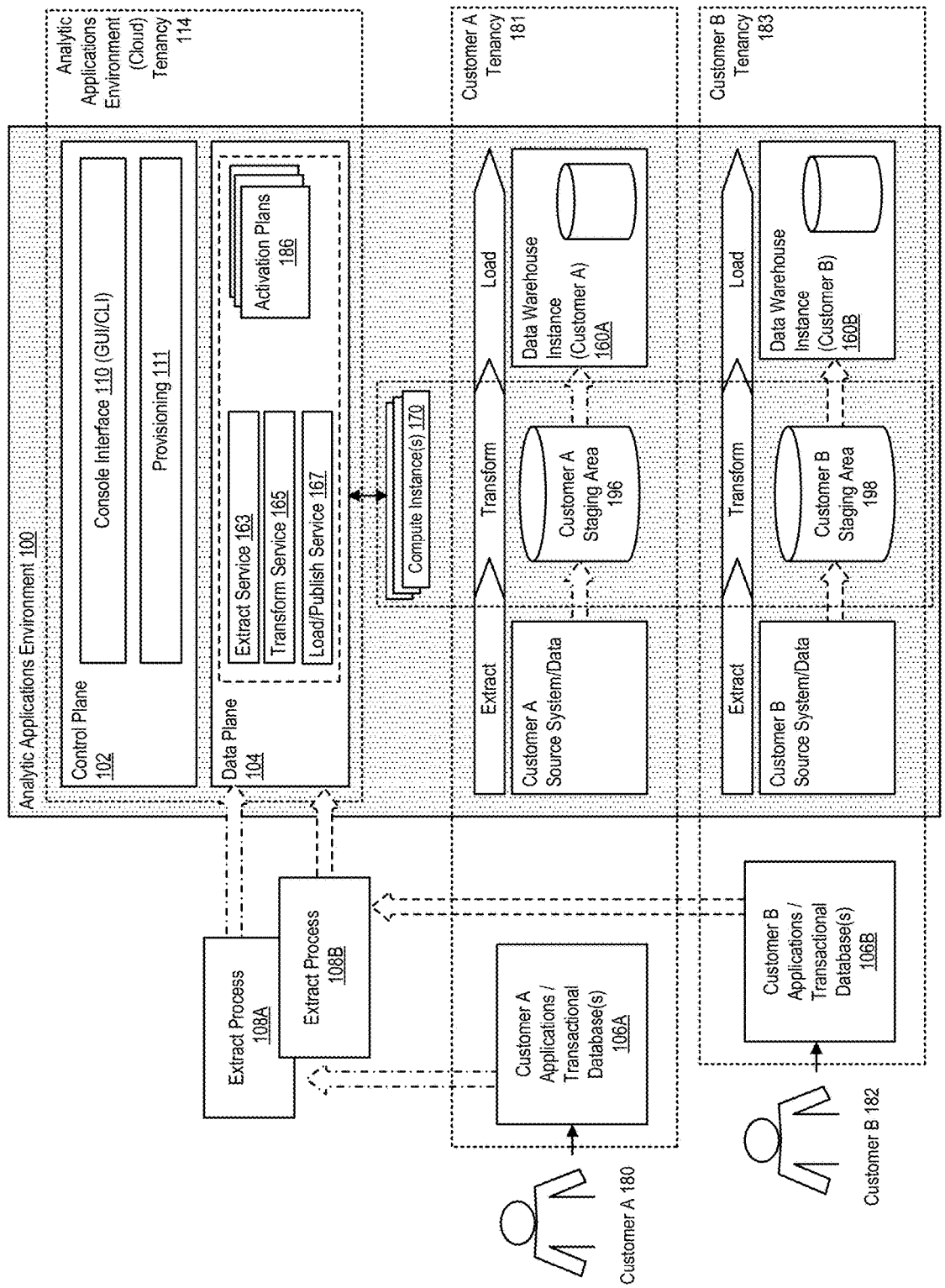
FIG. 7 further illustrates a system for providing an analytic applications environment, in accordance with an embodiment.

FIG. 7 further illustrates a system for providing an analytic applications environment, in accordance with an embodiment.

In accordance with an embodiment, the extracting, transforming and loading data from enterprise applications to a data warehouse instance involves multiple stages, and each stage can have several sequential or parallel jobs; and run on different spaces/hardware, including different staging areas 196, 198 for each customer.

Analytic Applications Environment Metrics

Figure 8:
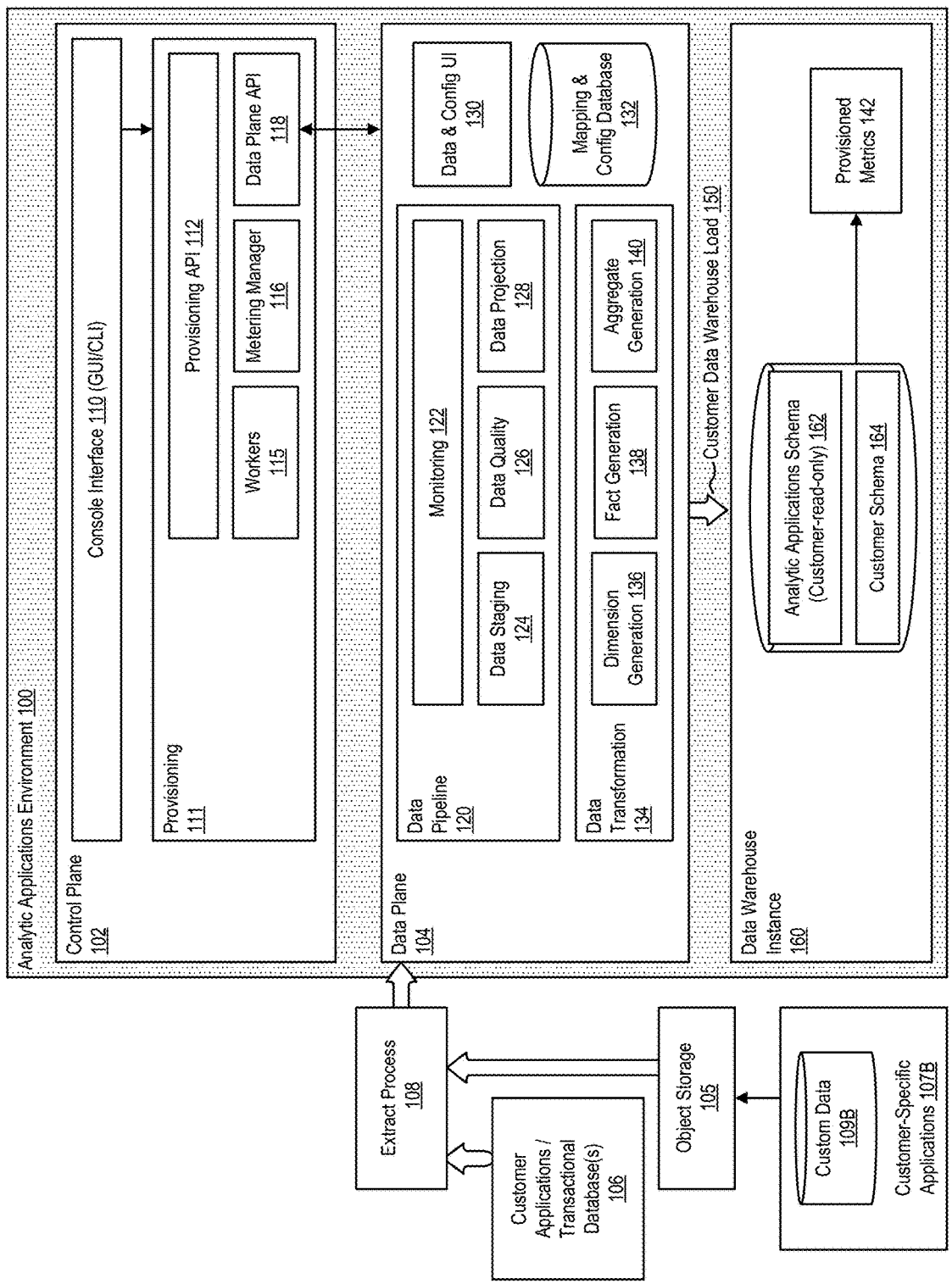
FIG. 8 further illustrates a system for providing an analytic applications environment, in accordance with an embodiment.

FIG. 8 further illustrates a system for providing an analytic applications environment, in accordance with an embodiment.

As illustrated in FIG. 8, in accordance with an embodiment, the metering manager can include functionality that meters services and usage of services provisioned through the control plane, and provide provisioned metrics 142.

For example, the metering manager can record a usage over time of processors provisioned via the control plane, for particular customers, for billing purposes. Likewise, the metering manager can record an amount of storage space of data warehouse partitioned for use by a customer of the SaaS environment, for billing purposes.

Analytic Applications Environment Customization

Figure 9:
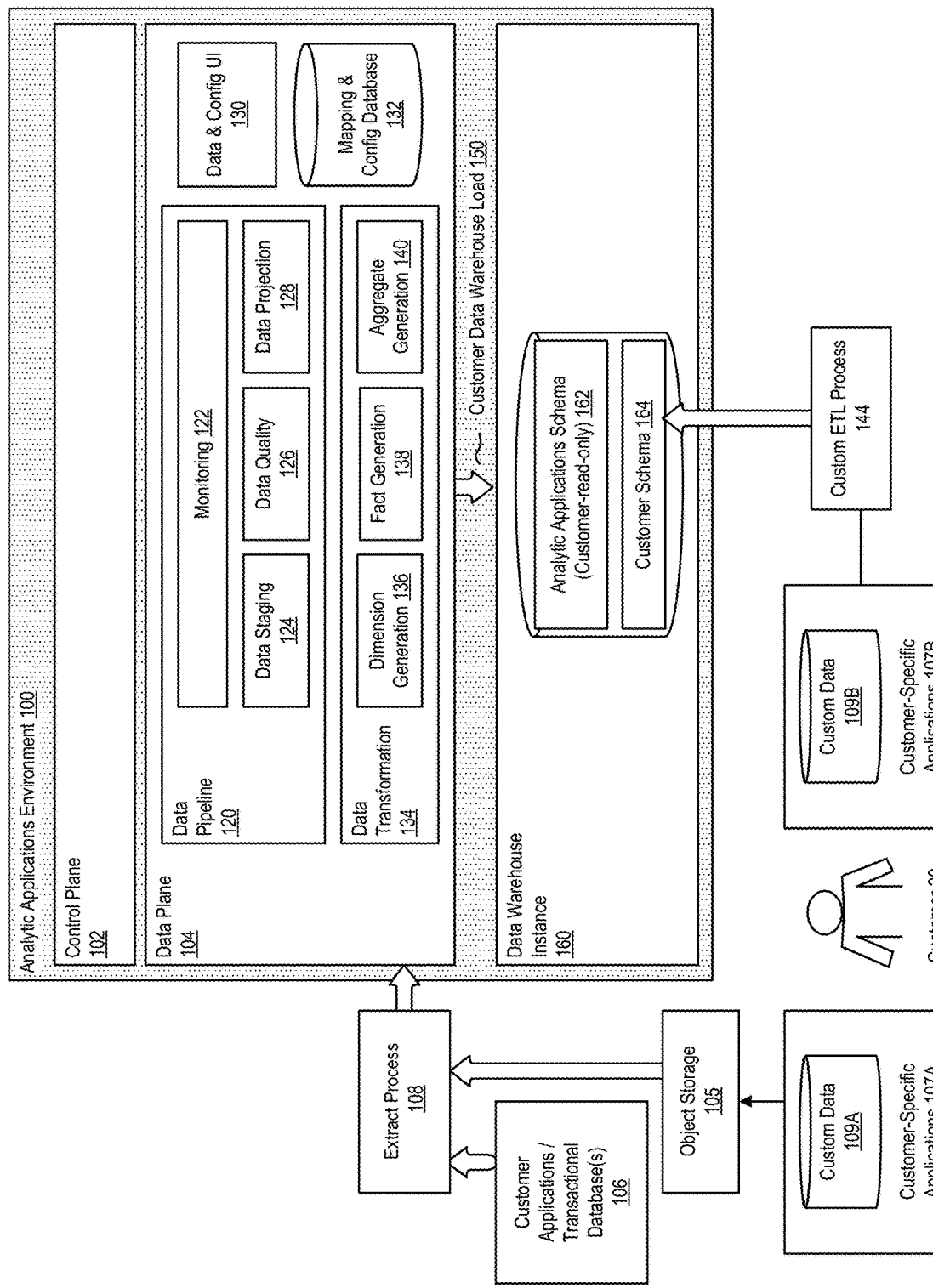
FIG. 9 further illustrates a system for providing an analytic applications environment, in accordance with an embodiment.

FIG. 9 further illustrates a system for providing an analytic applications environment, in accordance with an embodiment.

As illustrated in FIG. 9, in accordance with an embodiment, in addition to data that can be sourced, e.g., from a customer's enterprise software application or data environment, using the data pipeline process as described above; one or more additional custom data 109A, 109B, that is sourced from one or more customer-specific applications 107A, 107B, can also be extracted, transformed, and loaded to a data warehouse instance, using either: the data pipeline process as described above, including in some examples the use of an object storage for storage of the data; and/or a custom ETL or other process 144 that is mutable from the customer's perspective. Once data has been loaded into their data warehouse instance, customers can create business database views that combine tables from both their customer schema and the software analytic application schema; and can query their data warehouse instance using an interface provided, for example, by a business productivity and analytics product suite, or by a SQL tool of the customer's choice.

Analytic Applications Environment Method

Figure 10:
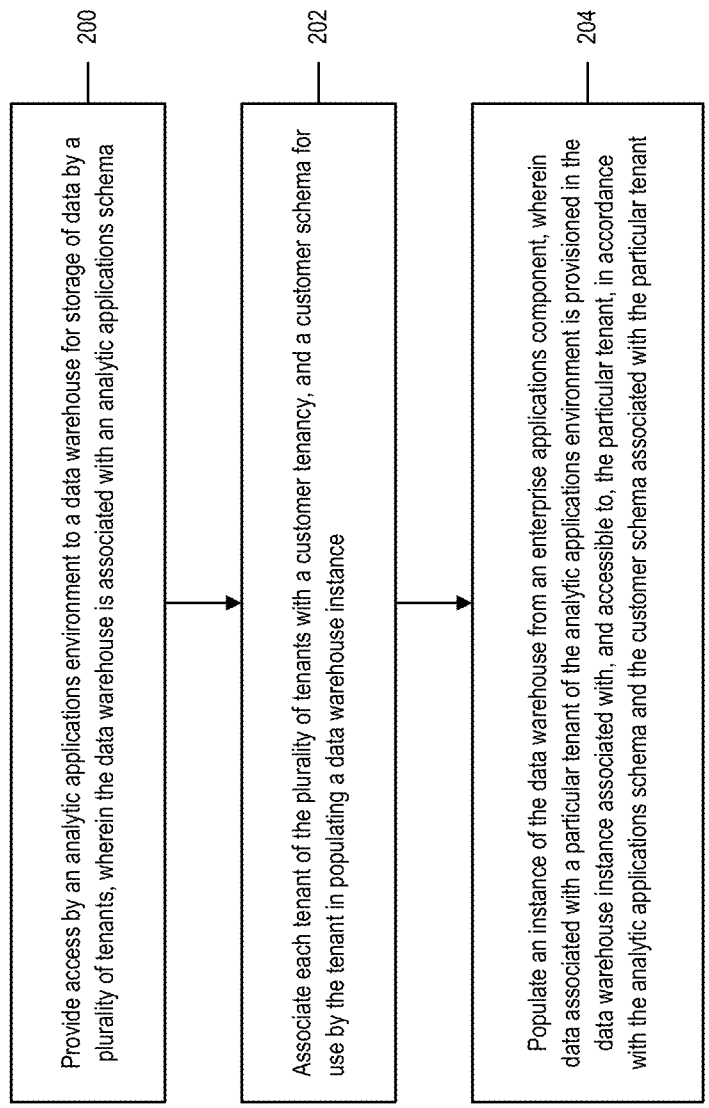
FIG. 10 illustrates a flowchart of a method for providing an analytic applications environment, in accordance with an embodiment.

FIG. 10 illustrates a flowchart of a method for providing an analytic applications environment, in accordance with an embodiment.

As illustrated in FIG. 10, in accordance with an embodiment, at step 200, an analytic applications environment provides access to a data warehouse for storage of data by a plurality of tenants, wherein the data warehouse is associated with an analytic applications schema.

At step 202, each tenant of the plurality of tenants is associated with a customer tenancy, and a customer schema for use by the tenant in populating a data warehouse instance.

At step 204, an instance of the data warehouse is populated with data received from an enterprise software application or data environment, wherein data associated with a particular tenant of the analytic applications environment is provisioned in the data warehouse instance associated with, and accessible to, the particular tenant, in accordance with the analytic applications schema and the customer schema associated with the particular tenant.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although several of the examples provided herein illustrate operation of an analytic applications environment with an enterprise software application or data environment such as, for example, an Oracle Fusion Applications environment; or within the context of a software-as-a-service (SaaS) or cloud environment such as, for example, an Oracle Analytics Cloud or Oracle Cloud Infrastructure environment; in accordance with various embodiments, the systems and methods described herein can be used with other types of enterprise software application or data environments, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for providing an analytic applications environment, comprising:
a computer including one or more processors, that provides access by an analytic applications environment to a data warehouse for storage of data by a plurality of tenants, wherein the data warehouse is associated with an analytic applications schema shared by the plurality of tenants, wherein the analytic applications schema is maintained and updated by the system within an analytic applications environment or cloud tenancy, and wherein each tenant of the plurality of tenants is additionally associated with a customer schema provided within a customer tenancy for use by the tenant in populating a data warehouse instance; and wherein an instance of the data warehouse is populated with data received from an enterprise software application or data environment, wherein data associated with a particular tenant of the analytic applications environment is provisioned in the data warehouse instance associated with, and accessible to, the particular tenant, based on a combination of the analytic applications schema shared by the plurality of tenants and maintained and updated by the system within an analytic applications environment or cloud tenancy, and the customer schema associated with the particular tenant and provided within the customer tenancy for use by the particular tenant in populating their data warehouse instance.

2. The system of claim 1, wherein a data pipeline or process operates in accordance with the analytic applications schema adapted to address particular analytics use cases or best practices, to receive data from the tenant's enterprise software application or data environment, for loading into the data warehouse instance.

3. The system of claim 1, wherein a first customer tenancy for a first tenant comprises a first database instance, a first staging area, and a first data warehouse instance of a plurality of data warehouses or data warehouse instances; and a second customer tenancy for a second tenant comprises a second database instance, a second staging area, and a second data warehouse instance of the plurality of data warehouses or data warehouse instances.

4. The system of claim 1, wherein the system is provide within or as part of a cloud environment.

5. The system of claim 1, wherein the instance of the data warehouse associated with the particular tenant of the analytic applications environment is populated with data received from an enterprise software application or data environment, as defined by a combination of the analytic applications schema shared by the plurality of tenants and a customer schema associated with the particular tenant.

6. The system of claim 1, wherein the analytic applications schema is used to pre-populate the data warehouse instance for the tenant, based on an analysis of the data within that tenant's enterprise applications environment.

7. The system of claim 1, wherein the analytic applications schema is maintained and updated by the system, within an analytic applications environment or cloud tenancy, to pre-populate a data warehouse instance for the customer, based on an analysis of the data within that customer's enterprise applications environment, within a customer tenancy.

8. A method for providing an analytic applications environment, comprising:

providing access by an analytic applications environment to a data warehouse for storage of data by a plurality of tenants, wherein the data warehouse is associated with an analytic applications schema shared by the plurality of tenants wherein the analytic applications schema is maintained and updated by the system within an analytic applications environment or cloud tenancy;

associating each tenant of the plurality of tenants with a customer tenancy, and a customer schema for use by the tenant in populating a data warehouse instance; and populating an instance of the data warehouse with data received from an enterprise software application or data environment, wherein data associated with a particular tenant of the analytic applications environment is provisioned in the data warehouse instance associated with, and accessible to, the particular tenant, based on a combination of the analytic applications schema shared by the plurality of tenants and maintained and updated by the system within an analytic applications environment or cloud tenancy, and the customer schema associated with the particular tenant and provided within the customer tenancy for use by the particular tenant in populating their data warehouse instance.

9. The method of claim 8, wherein a data pipeline or process operates in accordance with the analytic applications schema adapted to address particular analytics use cases or best practices, to receive data from the tenant's enterprise software application or data environment, for loading into the data warehouse instance.

10. The method of claim 8, wherein a first customer tenancy for a first tenant comprises a first database instance, a first staging area, and a first data warehouse instance of a plurality of data warehouses or data warehouse instances; and a second customer tenancy for a second tenant comprises a second database instance, a second staging area, and a second data warehouse instance of the plurality of data warehouses or data warehouse instances.

11. The method of claim 8, wherein the method is performed by a system provided within or as part of a cloud environment.

12. The method of claim 8, wherein the instance of the data warehouse associated with the particular tenant of the analytic applications environment is populated with data received from an enterprise software application or data environment, as defined by a combination of the analytic applications schema shared by the plurality of tenants and a customer schema associated with the particular tenant.

13. The method of claim 8, wherein the analytic applications schema is used to pre-populate the data warehouse instance for the tenant, based on an analysis of the data within that tenant's enterprise applications environment.

14. The method of claim 8, wherein the analytic applications schema is maintained and updated by the system, within an analytic applications environment or cloud tenancy, to pre-populate a data warehouse instance for the customer, based on an analysis of the data within that customer's enterprise applications environment, within a customer tenancy.

15. A non-transitory computer readable storage medium having instructions thereon, which when read and executed by a computer including one or more processors cause the computer to perform a method comprising:

providing access by an analytic applications environment to a data warehouse for storage of data by a plurality of tenants, wherein the data warehouse is associated with an analytic applications schema shared by the plurality of tenants, wherein the analytic applications schema is maintained and updated by the system within an analytic applications environment or cloud tenancy, and wherein each tenant of the plurality of tenants is additionally associated with a customer schema for use by the tenant in populating a data warehouse instance;

populating an instance of the data warehouse with data received from an enterprise software application or data environment, wherein data associated with a particular tenant of the analytic applications environment is provisioned in the data warehouse instance associated with, and accessible to, the particular tenant, based on a combination of the analytic applications schema shared by the plurality of tenants and maintained and updated by the system within an analytic applications environment or cloud tenancy, and the customer schema associated with the particular tenant and provided within the customer tenancy for use by the particular tenant in populating their data warehouse instance.

16. The non-transitory computer readable storage medium of claim 15, wherein a data pipeline or process operates in accordance with the analytic applications schema adapted to address particular analytics use cases or best practices, to receive data from the tenant's enterprise software application or data environment, for loading into the data warehouse instance.

17. The non-transitory computer readable storage medium of claim 15, wherein a first customer tenancy for a first tenant comprises a first database instance, a first staging area, and a first data warehouse instance of a plurality of data warehouses or data warehouse instances; and a second customer tenancy for a second tenant comprises a second database instance, a second staging area, and a second data warehouse instance of the plurality of data warehouses or data warehouse instances.

18. The non-transitory computer readable storage medium of claim 15, wherein the method is performed by a system provided within or as part of a cloud environment.

19. The non-transitory computer readable storage medium of claim 15, wherein the instance of the data warehouse associated with the particular tenant of the analytic applications environment is populated with data received from an enterprise software application or data environment, as defined by a combination of the analytic applications schema shared by the plurality of tenants and a customer schema associated with the particular tenant.

20. The non-transitory computer readable storage medium of claim 15, wherein the analytic applications schema is used to pre-populate the data warehouse instance for the tenant, based on an analysis of the data within that tenant's enterprise applications environment.

* * * * *